(12) United States Patent
Gotanda et al.

(10) Patent No.: US 10,229,405 B2
(45) Date of Patent: Mar. 12, 2019

(54) MERCHANDISE SALES DATA PROCESSING APPARATUS, AND PROGRAM THEREFOR

(71) Applicant: TOSHIBA TEC KABUSHIKI KAISHA, Tokyo (JP)

(72) Inventors: Tsuyoshi Gotanda, Tokyo (JP); Taro Ando, Shizuoka (JP); Yumiko Okuma, Tokyo (JP); Yasutsugu Sasaki, Tokyo (JP); Katsuhito Mochizuki, Shizuoka (JP); Shigeki Nimiya, Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/405,460

(22) Filed: Jan. 13, 2017

(65) Prior Publication Data

US 2017/0132605 A1 May 11, 2017

Related U.S. Application Data

(63) Continuation of application No. 14/194,554, filed on Feb. 28, 2014.

(30) Foreign Application Priority Data

Mar. 1, 2013 (JP) .................................. 2013-041190
Jun. 28, 2013 (JP) .................................. 2013-136903

(51) Int. Cl.
*G06Q 20/04* (2012.01)
*G06Q 20/20* (2012.01)
(Continued)

(52) U.S. Cl.
CPC ....... *G06Q 20/209* (2013.01); *G06K 7/10861* (2013.01); *G06Q 20/0453* (2013.01); *G06Q 20/20* (2013.01); *G06Q 30/0226* (2013.01)

(58) Field of Classification Search
None
See application file for complete search history.

(56) References Cited

U.S. PATENT DOCUMENTS

| 6,249,773 | B1 | 6/2001 | Allard et al. |
| 6,611,810 | B1 * | 8/2003 | Kolls ..................... G06Q 10/10 |
| | | | 705/14.23 |

(Continued)

FOREIGN PATENT DOCUMENTS

| JP | 2003-077064 | 3/2003 |
| JP | 2003-123144 | 4/2003 |

(Continued)

OTHER PUBLICATIONS

Japanese Office Action dated Jan. 6, 2015, filed in Japanese counterpart Application No. 2013-136903, 9 pages (with translation).

(Continued)

*Primary Examiner* — Ashford S Hayles
(74) *Attorney, Agent, or Firm* — Kim & Stewart LLP

(57) ABSTRACT

A merchandise sales data processing apparatus includes a code reading unit configured to read a code of a customer purchasing a merchandise, an electronic receipt issuing instruction unit configured to receive an instruction for issuing electronic receipt information associated with merchandise sales data, an electronic receipt generation unit configured to generate the electronic receipt information in correlation with the code of the customer when the instruction for issuing the electronic receipt information is received by the electronic receipt issuing instruction unit, a transmission unit configured to transmit a company code indicating a company and the electronic receipt information generated by the electronic receipt generation unit to an electronic receipt server, and a receipt printing unit configured to print a paper receipt associated with the merchandise sales data (Continued)

when the instruction for issuing the electronic receipt information is not received by the electronic receipt issuing instruction unit.

17 Claims, 19 Drawing Sheets

(51) Int. Cl.
  *G06Q 30/02* (2012.01)
  *G06K 7/10* (2006.01)
  *G06Q 20/00* (2012.01)

(56) References Cited

U.S. PATENT DOCUMENTS

| | | |
|---|---|---|
| 6,795,710 B1 | 9/2004 | Creemer |
| 7,130,814 B1 | 10/2006 | Szabo et al. |
| 7,376,433 B1 | 5/2008 | Hose |
| 7,552,087 B2 | 6/2009 | Schultz et al. |
| 7,991,664 B1 | 8/2011 | Stone |
| 8,554,670 B1 | 10/2013 | Blank et al. |
| 8,600,835 B1 | 12/2013 | Lueck |
| 8,756,159 B1 | 6/2014 | Gibson et al. |
| 8,788,350 B2 | 7/2014 | McKenna et al. |
| 8,843,398 B2 | 9/2014 | Argue et al. |
| 8,868,522 B1 | 10/2014 | Zennaro et al. |
| 2002/0188559 A1* | 12/2002 | Schultz ............ G06Q 20/0453 705/39 |
| 2003/0055733 A1 | 3/2003 | Marshall et al. |
| 2004/0064373 A1* | 4/2004 | Shannon ............ G06Q 20/0453 705/24 |
| 2005/0256781 A1 | 11/2005 | Sands et al. |
| 2006/0157564 A1 | 7/2006 | Schulte |
| 2007/0045405 A1 | 3/2007 | Rothschild |
| 2007/0069013 A1* | 3/2007 | Seifert ............ G06Q 20/0453 235/383 |
| 2007/0164106 A1 | 7/2007 | McDevitt et al. |
| 2008/0268868 A1 | 10/2008 | Maitland |
| 2008/0313062 A1 | 12/2008 | Williams et al. |
| 2008/0313066 A1 | 12/2008 | Sholtis et al. |
| 2009/0069033 A1 | 3/2009 | Karstens et al. |
| 2010/0006646 A1 | 1/2010 | Stiller |
| 2010/0039666 A1* | 2/2010 | Tsukada ............ G06Q 20/209 358/1.15 |
| 2010/0082454 A1 | 4/2010 | Narayanaswami et al. |
| 2010/0177343 A1* | 7/2010 | Shapiro ............ G06Q 10/0637 358/1.15 |
| 2010/0179881 A1 | 7/2010 | Wiederstein |
| 2010/0305855 A1 | 12/2010 | Dutton et al. |
| 2010/0331016 A1 | 12/2010 | Dutton et al. |
| 2011/0184822 A1* | 7/2011 | Matkovic ............ G06Q 20/202 705/18 |
| 2011/0231272 A1* | 9/2011 | Englund ............ G06Q 20/20 705/21 |
| 2012/0078682 A1 | 3/2012 | Pinsley et al. |
| 2012/0084135 A1 | 4/2012 | Nissan et al. |
| 2012/0084391 A1* | 4/2012 | Patel ............ G06Q 20/0453 709/217 |
| 2012/0101876 A1 | 4/2012 | Turvey et al. |
| 2012/0109693 A1 | 5/2012 | Smith |
| 2012/0150704 A1 | 6/2012 | Acklam |
| 2012/0221446 A1 | 8/2012 | Grigg et al. |
| 2012/0253958 A1* | 10/2012 | Sock ............ G06Q 20/0453 705/21 |
| 2012/0284101 A1 | 11/2012 | Schiller et al. |
| 2012/0290422 A1 | 11/2012 | Bhinder |
| 2012/0290609 A1 | 11/2012 | Britt |
| 2013/0046602 A1 | 2/2013 | Grigg et al. |
| 2013/0046717 A1 | 2/2013 | Grigg et al. |
| 2013/0110659 A1 | 5/2013 | Phillips et al. |
| 2013/0151344 A1* | 6/2013 | Tavares ............ G06Q 30/00 705/14.65 |
| 2013/0159077 A1 | 6/2013 | Stringfellow et al. |
| 2013/0159090 A1* | 6/2013 | Boal ............ G06Q 30/0207 705/14.38 |
| 2013/0211936 A1 | 8/2013 | Sulaiman et al. |
| 2013/0246273 A1* | 9/2013 | Ovick ............ G06Q 20/045 705/44 |
| 2013/0268340 A1 | 10/2013 | Colon et al. |
| 2014/0006129 A1 | 1/2014 | Heath |
| 2014/0025515 A1 | 1/2014 | Argue et al. |
| 2014/0058861 A1* | 2/2014 | Argue ............ G07F 17/42 705/18 |
| 2014/0067575 A1 | 3/2014 | Nevada |
| 2014/0067676 A1* | 3/2014 | Woodall ............ G06Q 20/322 705/44 |
| 2014/0074675 A1 | 3/2014 | Calman et al. |
| 2014/0095063 A1 | 4/2014 | Saraswat |
| 2014/0156410 A1 | 6/2014 | Wuersch et al. |
| 2014/0172604 A1* | 6/2014 | Argue ............ G06Q 20/209 705/21 |
| 2014/0188648 A1 | 7/2014 | Argue et al. |
| 2014/0195361 A1 | 7/2014 | Murphy et al. |
| 2014/0229305 A1* | 8/2014 | Ellan ............ G06Q 20/209 705/17 |
| 2014/0244462 A1* | 8/2014 | Maenpaa ............ G06Q 20/0453 705/35 |
| 2014/0279494 A1 | 9/2014 | Wiesman et al. |
| 2014/0289047 A1 | 9/2014 | Yee et al. |
| 2015/0088714 A1 | 3/2015 | Votaw et al. |
| 2015/0310564 A1 | 10/2015 | Peterson |

FOREIGN PATENT DOCUMENTS

| | | |
|---|---|---|
| JP | 2004-151838 | 5/2004 |
| JP | 2005-056143 | 3/2005 |
| JP | 2005-266962 | 9/2005 |
| JP | 2007-316750 | 12/2007 |

OTHER PUBLICATIONS

Japanese Office Action filed May 22, 2018 in counterpart Japanese Patent Application No. 2017-131680 (6 pages) (with machine translation).

* cited by examiner

| MERCHANDISE D | | AMOUNT | 4 |
|---|---|---|---|
| | | TOTAL | 837 YEN |
| SUBTOTAL | 130 YEN | CHANGE | 0 YEN |

ELECTRONIC RECEIPT IS
ISSUED, AND RECEIPT IS
NOT PRINTED

FIG. 10

| No. | ATTRIBUTE | MERCHANDISE NAME | AMOUNT | UNIT COST | DIS-COUNT | AMOUNT OF MONEY | TAX |
|---|---|---|---|---|---|---|---|
| 1 | | MERCHANDISE A | 1 | 398 | | 398 | IN |
| 2 | | MERCHANDISE B | 1 | 152 | | 152 | IN |
| 3 | | MERCHANDISE C | 1 | 157 | | 157 | IN |
| 4 | | MERCHANDISE D | 1 | 130 | | 130 | IN |
| 5 | | | | | | | IN |
| 6 | | | | | | | IN |
| 99 | | | | | | | IN |
| 999 | | | | | | | |

BUSINESS MENU — REGISTRATION DETAILS — TWO PEOPLE SYSTEM — CASHIER-CHECKER ○○ ○○

28  IN: TAX INCLUDED

RECEIPT UNNECESSARY

TO REGISTRATION BUTTON

AMOUNT 4
837 YEN

TOTAL  837 YEN

4  DIS-COUNT (YEN)  DISCOUNT (%)  MEMBERSHIP CARD  PAYMENT [SUB TOTAL]

MERCHANDISE SALES DATA PROCESSING APPARATUS, AND PROGRAM THEREFOR

CROSS-REFERENCE TO RELATED APPLICATIONS

This application is a continuation of U.S. patent application Ser. No. 14/194,554, filed on Feb. 28, 2014, which is based upon and claims the benefit of priority from Japanese Patent Application No. 2013-041190, filed on Mar. 1, 2013, and Japanese Patent Application No. 2013-136903, filed on Jun. 28, 2013, the entire contents of each of which are incorporated herein by reference.

FIELD

Exemplary embodiments described herein relate to a merchandise sales data processing apparatus, and a program therefor.

BACKGROUND

In the related art, an electronic receipt system is known in which a customer receipt is electronically delivered by a store to a portable terminal or the like of the customer in connection with settlement of merchandise purchased by the customer.

By replacing a paper receipt with electronic data in this way, the store benefits because the consumption of paper can be reduced. In addition, the store can attach a coupon or the like associated with purchased merchandise to the electronic receipt, as a way to carry out merchandise sales promotion or campaign advertisement.

However, the electronic receipt system of the related art is only introduced on a per company basis and by a company which is a seller of merchandise or services. For this reason, a customer of a store of a company which has not introduced the electronic receipt system, has to receive a paper receipt, and thus a widespread introduction of the electronic receipt system is desirable. Further, it is also desirable to prevent a paper receipt from being unnecessarily issued from a point of sale (POS) terminal when an electronic receipt system is used.

DESCRIPTION OF THE DRAWINGS

FIG. 8 is a front view illustrating a display example of an operator display unit of the POS terminal.

FIG. 9 is a front view illustrating a display example of a customer display unit of the POS terminal.

FIG. 10 is a front view illustrating a display example of the operator display unit of the POS terminal.

DETAILED DESCRIPTION

Embodiments provide a merchandise sales data processing apparatus and a program therefor, capable of promoting introduction of an electronic receipt, and preventing a paper receipt from being unnecessarily issued by a merchandise sales data processing apparatus that is configured to issue electronic receipts.

A merchandise sales data processing apparatus according to an exemplary embodiment includes a code reading unit, an electronic receipt issuing instruction unit, an electronic receipt generation unit, a transmission unit, and a receipt printing unit. The code reading unit is configured to read a code of a customer purchasing a merchandise. The electronic receipt issuing instruction unit is configured to receive an instruction for issuing electronic receipt information associated with merchandise sales data. The electronic receipt generation is configured to generate the electronic receipt information in correlation with the code of the customer when the instruction for issuing the electronic receipt information is received by the electronic receipt issuing instruction unit. The transmission unit is configured to transmit a company code indicating a company and the electronic receipt information generated by the electronic receipt generation unit to an electronic receipt server. The receipt printing is configured to print a paper receipt associated with the merchandise sales data when the instruction for issuing the electronic receipt information is not received by the electronic receipt issuing instruction unit.

An exemplary embodiment will be described with reference to the drawings.

Figure 1:
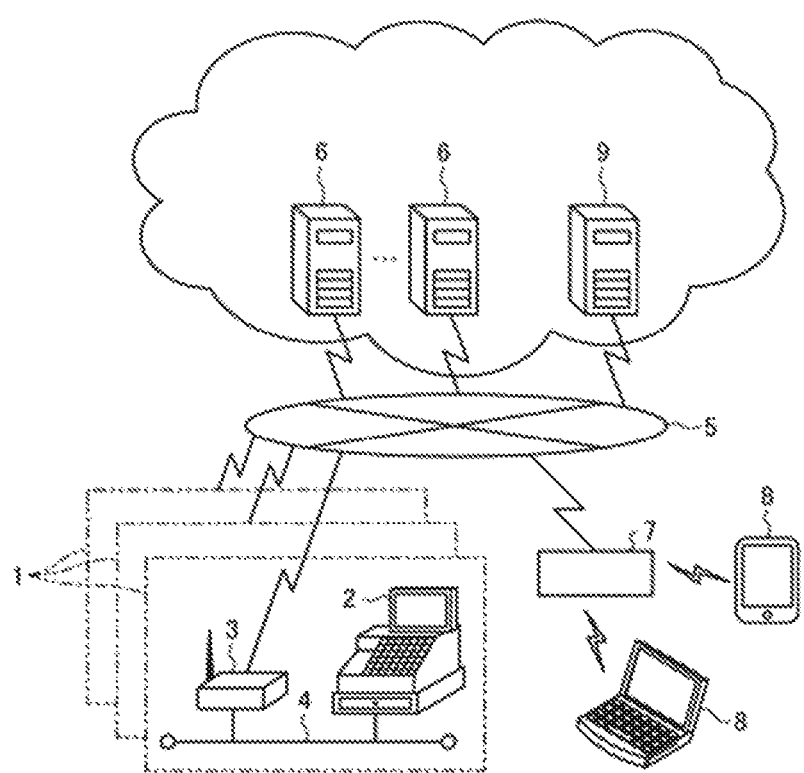
FIG. 1 is a configuration diagram illustrating an overall configuration of an electronic receipt system according to an exemplary embodiment.

FIG. 1 is a configuration diagram illustrating an overall configuration of an electronic receipt system according to the exemplary embodiment. As illustrated in FIG. 1, each of stores 1 is provided with a POS terminal 2 (FIG. 1 illustrates a single terminal, but a plurality of terminals may be provided) which is a merchandise sales data processing apparatus performing a merchandise sales data process, and a router 3. The stores 1 are stores such as a convenience store, a supermarket, a grocery store, a drug store, an apparel store, an home electric appliance shop, a department store, a household goods store, and a restaurant or a chain store (hereinafter, referred to as a store). The POS terminal 2 and the router 3 are connected to each other via a local area network (LAN) 4 in the store. The router 3 is an apparatus which connects the LAN 4 in the store to a network 5 such as the Internet or a virtual private network (VPN). In addition, although not particularly illustrated, a store server which controls the POS terminal 2 may be provided in the stores 1.

Electronic receipt servers 6 are connected to the network 5. A plurality of electronic receipt servers 6 are provided on a per company basis which operates stores and is a seller of merchandise or services, and function as company receipt management servers which store and manage electronic receipt information according to each company code indicating the company operating the stores. In addition, the electronic receipt server 6 may employ a headquarter server of a POS system which performs functions such as sales management, sales analysis, and inventory management of each company operating stores.

In addition, a portable terminal 8 is connected to the network 5 via a base station 7 which performs wireless communication in accordance with a standard such as Wireless Fidelity (Wi-Fi). The portable terminal 8 is an information processing apparatus in which a web browser is mounted, such as, for example, a smart phone, a mobile phone, a personal digital assistant (PDA), or a tablet computer. Further, an information processing apparatus such as a notebook type personal computer may be used instead of the portable terminal 8.

Furthermore, the network 5 is connected to an electronic receipt management server 9 which functions as a customer receipt management server which stores and collectively manages electronic receipt information of various companies operating stores. A consumer who has registered as a member to receive an electronic receipt service can obtain electronic receipt information from the electronic receipt management server 9 by using the portable terminal 8 via the network 5. The electronic receipt management server 9 is managed by, for example, a third-party organization other than a company which manages electronic receipt information with the electronic receipt server 6. In addition, a third-party organization and the like may also manage the electronic receipt server 6. Further, the electronic receipt management server 9 may also perform the function of the electronic receipt server 6, and thus management may be performed by a single server. Furthermore, a function of collectively managing electronic receipt information of each company, indicating a company operating stores, by using a plurality of company codes, may be provided as a service (application), for example, in a form of Software as a Service (SaaS) which is a kind of cloud computing.

Membership registration of a consumer for receiving an electronic receipt service is performed, for example, as follows. The consumer transmits a blank mail to a member management server (not illustrated) from the portable terminal 8 via the network 5. The member management server transmits a uniform resource locator (URL) indicating a page for the membership registration to the received mail address. The consumer accesses the URL indicating a page for the membership registration from the portable terminal 8, so as to display an input screen, and inputs information necessary for the membership registration. After inputting of the necessary information by the consumer is finished, an input confirmation screen is displayed on the portable terminal 8. After the consumer confirms the input information, a member is registered in a member master file. Then, the member management server sends a membership registration completion mail including a membership code and a password to the portable terminal 8. Accordingly, the membership registration is finished.

In the electronic receipt system with this configuration, electronic receipt information, which indicates content of settlement generated by the POS terminal 2 of the store 1 performing a merchandise sales data process, is transmitted to the electronic receipt management server 9 via the electronic receipt server 6 on the network 5, and the electronic receipt information is transmitted from the electronic receipt management server 9 to the portable terminal 8 of a member. The member may display the electronic receipt information on a display unit of the portable terminal 8 so as to confirm the content. In addition, the electronic receipt management server 9 may make the electronic receipt information available through the web. The portable terminal 8 having a web browser mounted therein may designate a uniform resource locator (URL) so as to download the electronic receipt information made available through the web to the portable terminal 8, thereby viewing the electronic receipt information from the web browser. Further, application software for viewing the electronic receipt information may be installed in the portable terminal 8, thereby viewing the electronic receipt information.

The portable terminal 8 stores the membership code and the password which are acquired by the consumer in the above-described way, in a storage unit 13 (refer to FIG. 2) or the like. The membership code which is stored as above may be outputted as a bar code display, a two-dimensional code display, or a wireless transmission using Near Field Communication (NFC) which is short-range wireless communication.

Hereinafter, a configuration of each part forming the electronic receipt system according to the present exemplary embodiment will be described.

Figure 2:
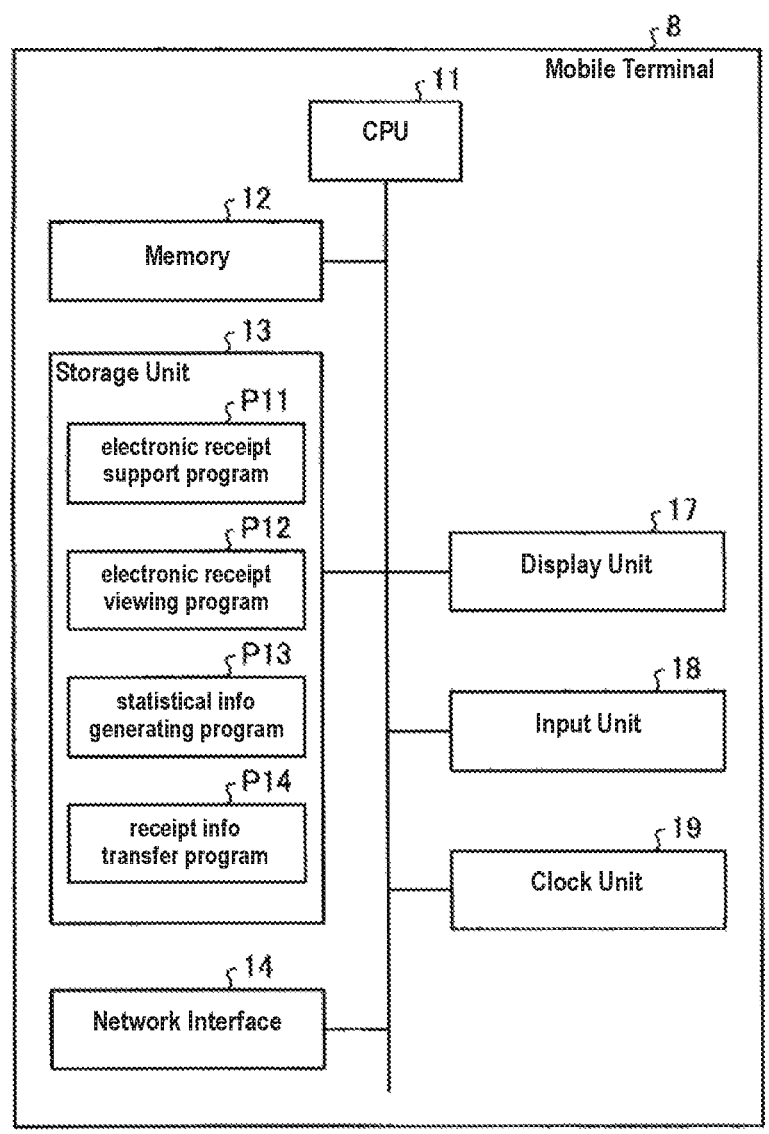
FIG. 2 is a block diagram illustrating a configuration of a portable terminal.

First, a configuration of the portable terminal 8 which is an information processing apparatus will be described with reference to a block diagram of FIG. 2. As illustrated in FIG. 2, the portable terminal 8 includes a central processing unit (CPU) 11 functioning as a control unit, a memory 12 which temporarily stores data, a storage unit 13 from and to which data can be read and written in response to a command from the CPU 11 and which stores programs or data, a network interface 14 which is connected to various public networks including the network 5, a display unit 17 which can display various information, an input unit 18 that operates the portable terminal 8, a clock unit 19 that tracks time, and the like. The input unit 18 may be a touch panel laminated in the display unit 17, or a key provided on a casing.

In addition to the web browser for viewing various information (content) published on the web, an electronic receipt support program P11 which is used to receive, from the electronic receipt management server 9, electronic receipt information generated after settlement of a merchandise sales data process, and an electronic receipt viewing program P12 which is used to view the received electronic receipt information, are installed in the storage unit 13 in advance.

In addition, the electronic receipt support program P11 and the electronic receipt viewing program P12, which are executed by the portable terminal 8, are recorded on a computer readable recording medium such as a CD-ROM, a flexible disk (FD), a CD-R, or a digital versatile disk (DVD) in a file of installable format or executable format.

Further, the electronic receipt support program P11 and the electronic receipt viewing program P12 executed by the portable terminal 8 may be stored in a computer connected to a network such as the Internet and may be downloaded via the network. Furthermore, the electronic receipt support program P11 and the electronic receipt viewing program P12 executed by the portable terminal 8 may be provided or distributed via a network such as the Internet.

Figure 3:
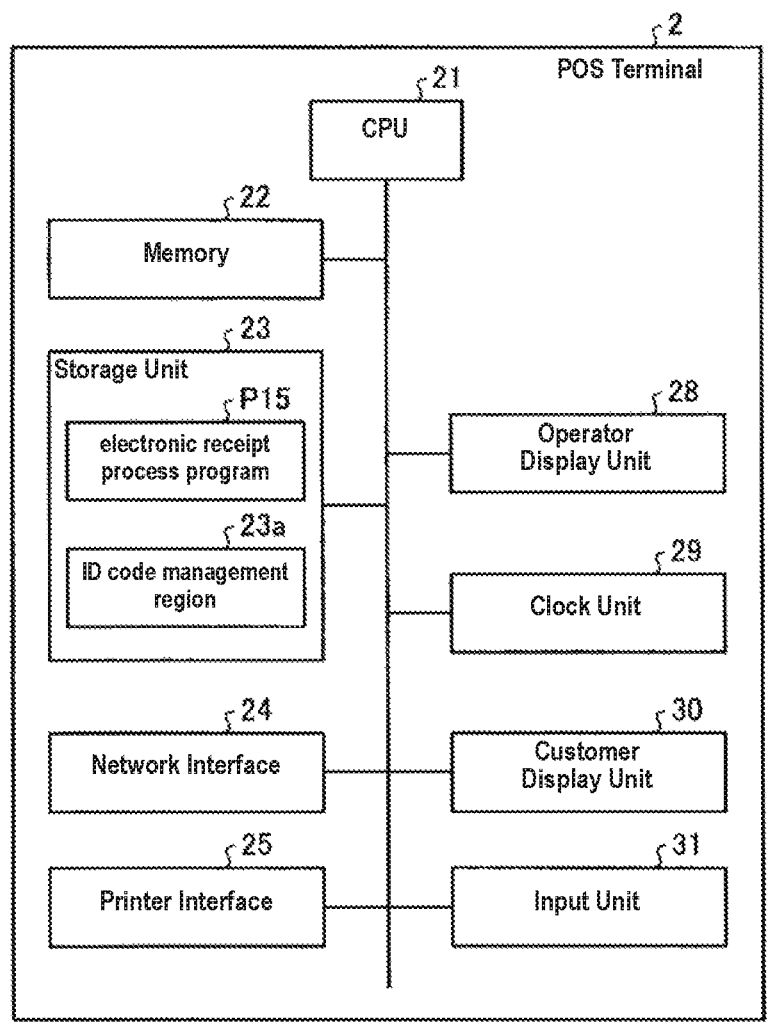
FIG. 3 is a block diagram illustrating a configuration of a POS terminal.

Next, a configuration of the POS terminal 2 which is a merchandise sales data processing apparatus will be described with reference to a block diagram of FIG. 3. As illustrated in FIG. 3, the POS terminal 2 includes a central processing unit (CPU) 21 functioning as a control unit, a memory 22 which temporarily stores data, a storage unit 23 from and to which data can be read and written in response to a command from the CPU 21 and which stores programs or data, a network interface 24 which is connected to the LAN 4 in the store, a printer interface 25 which is connected to a printer, an operator display unit 28 which displays various information for an operator, a clock unit 29 which tracks time, a customer display unit 30 which displays various information for a customer, an input unit 31 which is used to operate the POS terminal 2, a code input unit 32 which performs code inputting, and the like. In addition, the input unit 31 also includes a touch panel laminated in the operator display unit 28 or the customer display unit 30. As the code input unit 32, a bar code scanner, a two-dimensional code scanner, an NFC communication device, or the like is used.

An identification code management region 23*a* is secured in the storage unit 23 as a region which preliminarily stores not only a POS number of the POS terminal 2, but also a company code (an identification code of a company operating stores), a business type and business category code, a store code indicating the store 1 in which the POS terminal 2 is installed, and the like. Here, the business type and business category code is a code (sorting code) for differentiating business types and business category of stores, such as, for example, a convenience store, a supermarket, a department store, a pharmacy, and a restaurant. In addition, such a business type can be customized by the user. Further, the company code (an identification code of a company operating stores) and the business type and business category code may be registered in the electronic receipt server 6.

In addition to software for executing various pieces of POS business including a merchandise sales data process, an electronic receipt processing program P15 for processing electronic receipt information which is electrically processed instead of a receipt printed and issued when the merchandise sales data process is performed is installed in the storage unit 23 in advance.

Further, the electronic receipt processing program P15, which is executed by the POS terminal 2, is recorded on a computer readable recording medium such as a CD-ROM, a flexible disk (FD), a CD-R, or a digital versatile disk (DVD) in a file of installable format or executable format.

In addition, the electronic receipt processing program P15 executed by the POS terminal 2 may be stored in a computer connected to a network such as the Internet and may be downloaded via the network. Furthermore, the electronic receipt processing program P15 executed by the POS terminal 2 may be provided or distributed via a network such as the Internet.

Figure 4:
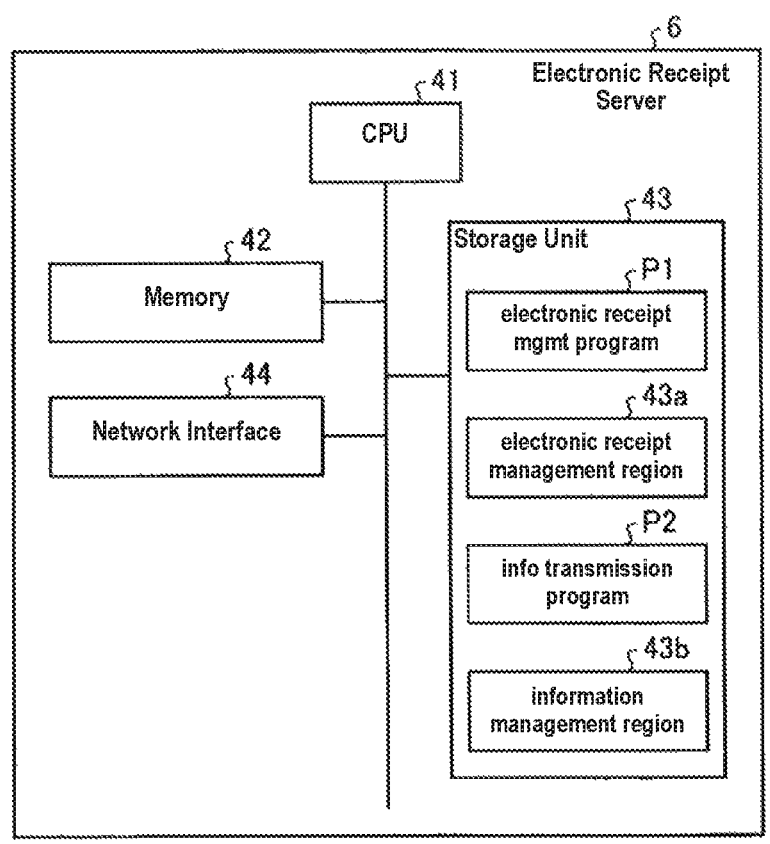
FIG. 4 is a block diagram illustrating a configuration of an electronic receipt server.

Next, a configuration of the electronic receipt server 6 which functions as a company receipt management server will be described with reference to a block diagram of FIG. 4. The electronic receipt server 6 includes a central processing unit (CPU) 41 functioning as a control unit, a memory 42 which temporarily stores data, a storage unit 43 from and to which data can be read and written in response to a command from the CPU 41 and which stores programs or data, a network interface 44 which is connected to the network 5, and the like.

An electronic receipt management region 43*a* is secured in the storage unit 43 as a region which stores electronic receipt information of each company operating stores. The electronic receipt information includes a company code (an identification code of a company operating stores), a business type and business category code, a store code, a consumer membership code, a POS number of the POS terminal 2, a receipt number, merchandise sales data, and the like.

In addition, an electronic receipt management program P1 for managing electronic receipt information received from the POS terminal 2 of each store 1 in the electronic receipt management region 43*a* is installed in the storage unit 43 in advance.

Further, an information transmission program P2 for transmitting the electronic receipt information managed in the electronic receipt management region 43*a* to the electronic receipt management server 9 is also installed in the storage unit 43 in advance.

Furthermore, the storage unit 43 is provided with an information management region 43*b* which stores various additional information correlated with desired merchandise, member, company and store. Here, the additional information is access information such as a URL for linking to a home page associated with campaign of a company, a URL for linking to a home page associated with a commercial message of a company, and a URL for linking to a coupon of a company.

In addition, the electronic receipt management program P1 and the information transmission program P2, which are executed by the electronic receipt server 6, are recorded on a computer readable recording medium such as a CD-ROM, a flexible disk (FD), a CD-R, or a digital versatile disk (DVD) in a file of installable format or executable format.

Further, the electronic receipt management program P1 and the information transmission program P2 executed by the electronic receipt server 6 may be stored in a computer connected to a network such as the Internet and may be downloaded via the network. Furthermore, the electronic receipt management program P1 and the information transmission program P2 executed by the electronic receipt server 6 may be provided or distributed via a network such as the Internet.

Figure 5:
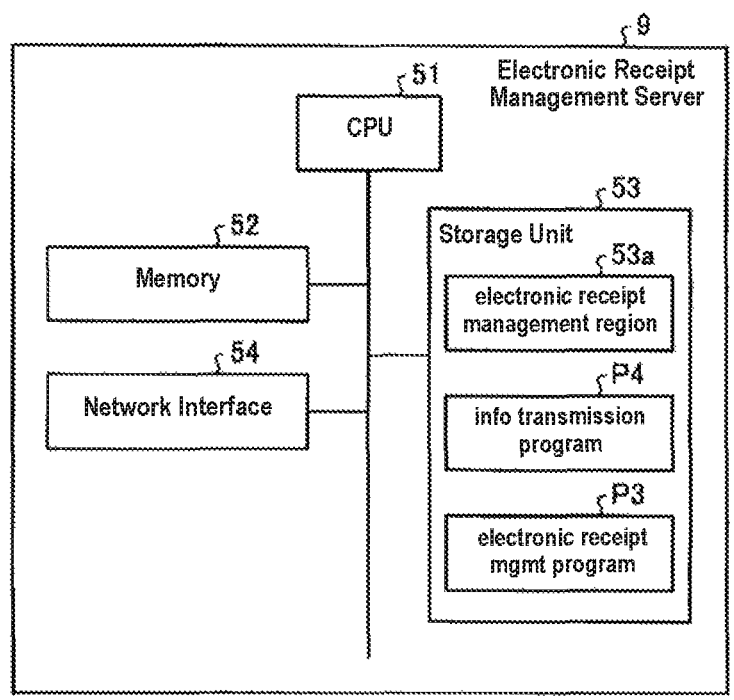
FIG. 5 is a block diagram illustrating a configuration of an electronic receipt management server.

Next, a configuration of the electronic receipt management server 9 which functions as a customer receipt management server will be described with reference to a block diagram of FIG. 5. The electronic receipt management server 9 includes a central processing unit (CPU) 51 functioning as a control unit, a memory 52 which temporarily stores data, a storage unit 53 from and to which data can be read and written in response to a command from the CPU 51 and which stores programs or data, a network interface 54 which is connected to the network 5, and the like.

An electronic receipt management region 53*a* is secured in the storage unit 53 as a region which collectively stores electronic receipt information of various companies operating stores. More specifically, the electronic receipt management region 53*a* manages electronic receipt information and additional information of various companies operating stores for each member. The electronic receipt information includes a membership code, a company code (an identification code of a company operating stores), a store code, a POS number of the POS terminal 2, a receipt number, merchandise sales data, additional information, and the like.

In addition, an electronic receipt management program P3 for managing additional information and electronic receipt information received from the electronic receipt server 6 of each company in the electronic receipt management region 53a is installed in the storage unit 53 in advance.

Further, an information transmission program P4 for transmitting the electronic receipt information and additional information of desired merchandise to the portable terminal 8 is also installed in the storage unit 53 in advance.

In addition, the electronic receipt management program P3 and the information transmission program P4, which are executed by the electronic receipt management server 9, are recorded on a computer readable recording medium such as a CD-ROM, a flexible disk (FD), a CD-R, or a digital versatile disk (DVD) in a file of installable format or executable format.

Further, the electronic receipt management program P3 and the information transmission program P4 executed by the electronic receipt management server 9 may be stored in a computer connected to a network such as the Internet and may be downloaded via the network. Furthermore, the electronic receipt management program P3 and the information transmission program P4 executed by the electronic receipt management server 9 may be provided or distributed via a network such as the Internet.

Next, an operation of each part forming the system according to the present exemplary embodiment will be described.

First, with reference to a functional block diagram illustrated in FIG. 6 and a flowchart illustrated in FIG. 7, a description will be made of an electronic receipt process which is executed when the CPU 21 of the POS terminal 2 is operated according to the electronic receipt processing program P15.

Figure 6:
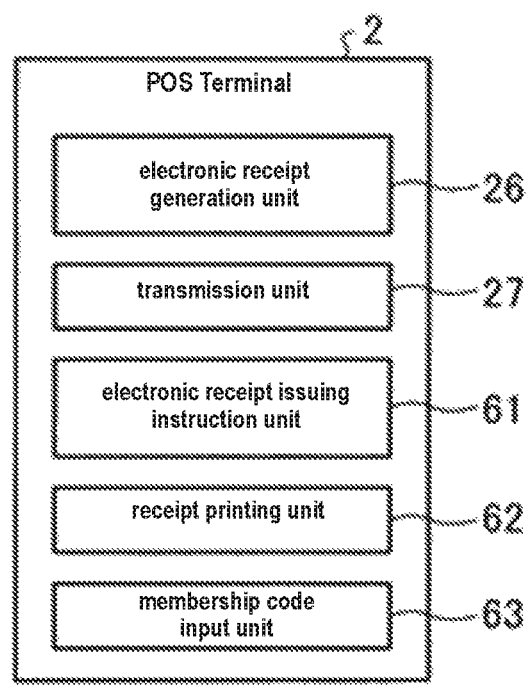
FIG. 6 is a functional block diagram of an electronic receipt process performed in the POS terminal.

As illustrated in FIG. 6, the electronic receipt processing program P15 executed by the POS terminal 2 has a modular configuration including: a membership code input unit 63 which functions as membership code input means; an electronic receipt generation unit 26 which functions as electronic receipt generation means; a transmission unit 27 which functions as transmission means; an electronic receipt issuing instruction unit 61 which functions as electronic receipt issuing instruction means; and a receipt printing unit 62 which functions as receipt printing means. As for the underlying hardware, the CPU 21 reads and executes the electronic receipt processing program P15 from the storage unit 23 so that the above-described units are loaded in the memory 22. Therefore, the electronic receipt generation unit 26 which is electronic receipt generation means, the transmission unit 27 which is transmission means, the electronic receipt issuing instruction unit 61 which is electronic receipt issuing instruction means, and the receipt printing unit 62 which is receipt printing means are embodied in the memory 22.

The membership code input unit 63 inputs a membership code of a consumer stored in the portable terminal 8 via the code input unit 32. The electronic receipt issuing instruction unit 61 receives an instruction as to whether or not electronic receipt information associated with merchandise sales data is issued. When there is an instruction for issuing electronic receipt information from the electronic receipt issuing instruction unit 61, the electronic receipt generation unit 26 associates a company code of a company operating stores with electronic receipt information which is electronically processed instead of a paper receipt which is printed and issued, when a merchandise sales data process is performed, and generates the electronic receipt information in correlation with a consumer membership code.

The transmission unit 27 transmits the electronic receipt information generated by the electronic receipt generation unit 26 to the electronic receipt server 6 which manages electronic receipt information on a per company basis corresponding to a company code. The receipt printing unit 62 prints a receipt associated with merchandise sales data when there is no instruction for issuing electronic receipt information from the electronic receipt issuing instruction unit 61.

When there is an input of a closing operation key or the like for starting a closing process of merchandise transaction, the CPU 21 of the POS terminal 2 checks whether or not a membership code is input and whether or not an electronic receipt is issued, and determines whether or not there is an electronic receipt issuing instruction corresponding to a settlement process based on the closing operation.

For example, any of the following methods may be employed for an electronic receipt issuing instruction to be issued.

1. A staff operates an "issue electronic receipt" button provided in the input unit 31 (for example, a keyboard) of the POS terminal 2.

2. A consumer who is a member displays a bar code that encodes the consumer membership code on the display unit 17 of the portable terminal 8, and a staff reads the bar code with the input unit 31 (for example, a bar code scanner) of the POS terminal 2.

3. A consumer who is a member operates an "issue electronic receipt" button which is displayed on the customer display unit 30 so as to be pressed.

4. A consumer who is a member displays a bar code that encodes the consumer membership code on the display unit 17 of the portable terminal 8, and the consumer who is a member reads the bar code with input unit 31 (for example, a bar code scanner (preferably, a scanner different from a scanner used at the merchandise register)) of the POS terminal 2 for himself or herself.

5. When a consumer who is a member presents a company membership card for receiving reward points, a company membership code of the company membership card is read with the input unit 31 (for example, a bar code scanner, a magnetic card reader, NFC, or the like) of the POS terminal 2, and a membership code of electronic receipt is associated with the read company membership code, it is determined that there is an electronic receipt issuing instruction.

6. A staff operates an "issue electronic receipt" button provided in the operator display unit 28 of the POS terminal 2.

Here, a description will be made of an example of a flow of an electronic receipt process including an electronic receipt issuing instruction in the above described method 6. FIG. 7 is a flowchart illustrating a flow of an electronic receipt process. As illustrated in FIG. 7, after a membership code of electronic receipt is input, when there is an input of a closing operation key or the like for starting a closing process of merchandise transaction (Yes in step S1), the CPU 21 (the electronic receipt issuing instruction unit 61) of the POS terminal 2 displays an "receipt printing confirmation screen" on the operator display unit 28 (step S2).

Figure 8:
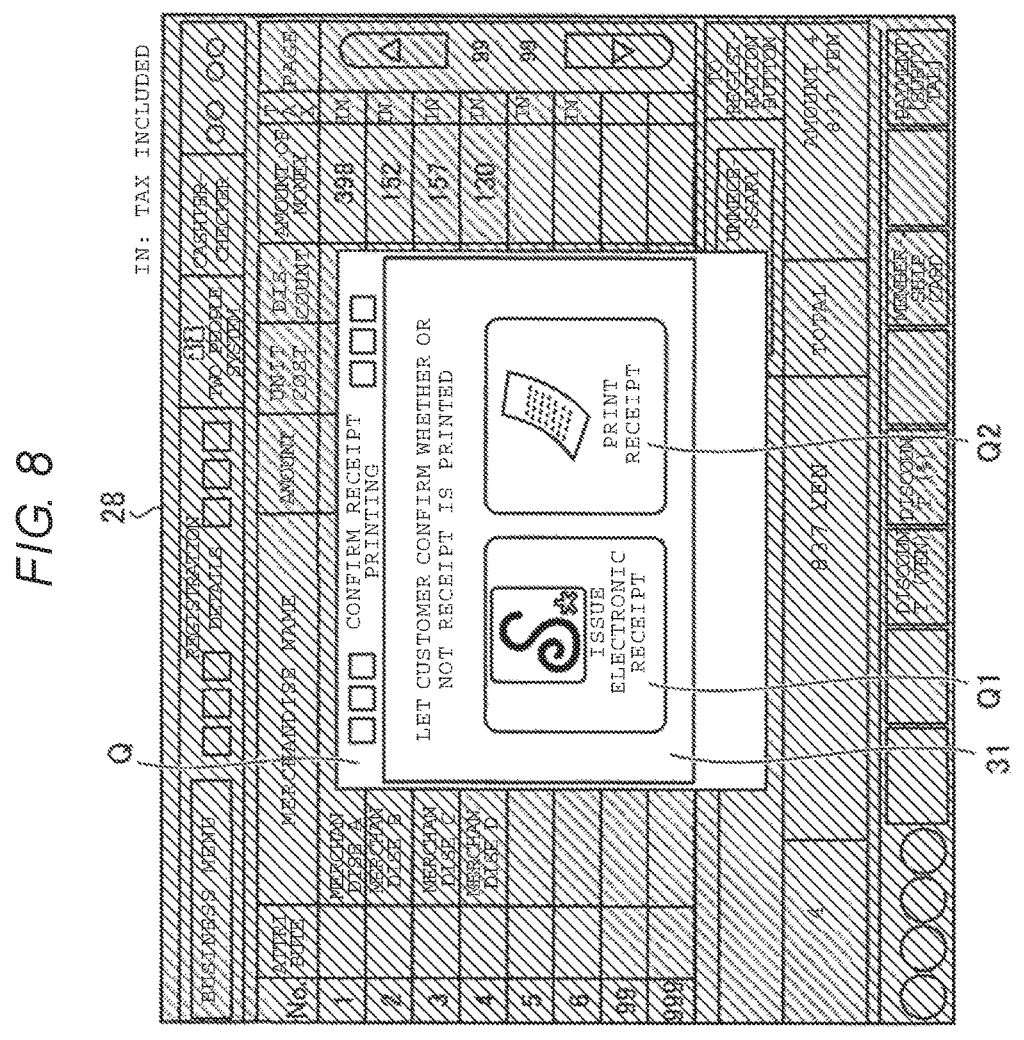

FIG. 8 is a front view illustrating a display example of the operator display unit 28 of the POS terminal 2. As illustrated in FIG. 8, a "receipt printing confirmation screen" Q is displayed on the operator display unit 28. An "issue electronic receipt" button Q1 (first input element) for instructing electronic receipt information to be issued, and a "issue receipt" button Q2 (second input element) for instructing a receipt to be printed, are displayed on the "receipt printing confirmation screen" Q.

Here, when the "issue electronic receipt" button Q1 is operated by an operator via the input unit 31, the CPU 21 (the electronic receipt issuing instruction unit 61) of the POS terminal 2 determines that there is an electronic receipt issuing instruction (Yes in step S3), and displays text, "An electronic receipt is issued, and a receipt is not printed" on the operator display unit 28 and the customer display unit 30 (step S4). FIG. 9 is a front view illustrating a display example of the customer display unit 30 of the POS terminal 2. A message m, "Electronic receipt is issued, and receipt is not printed" is displayed on the customer display unit 30, as illustrated in FIG. 9.

Figure 7:
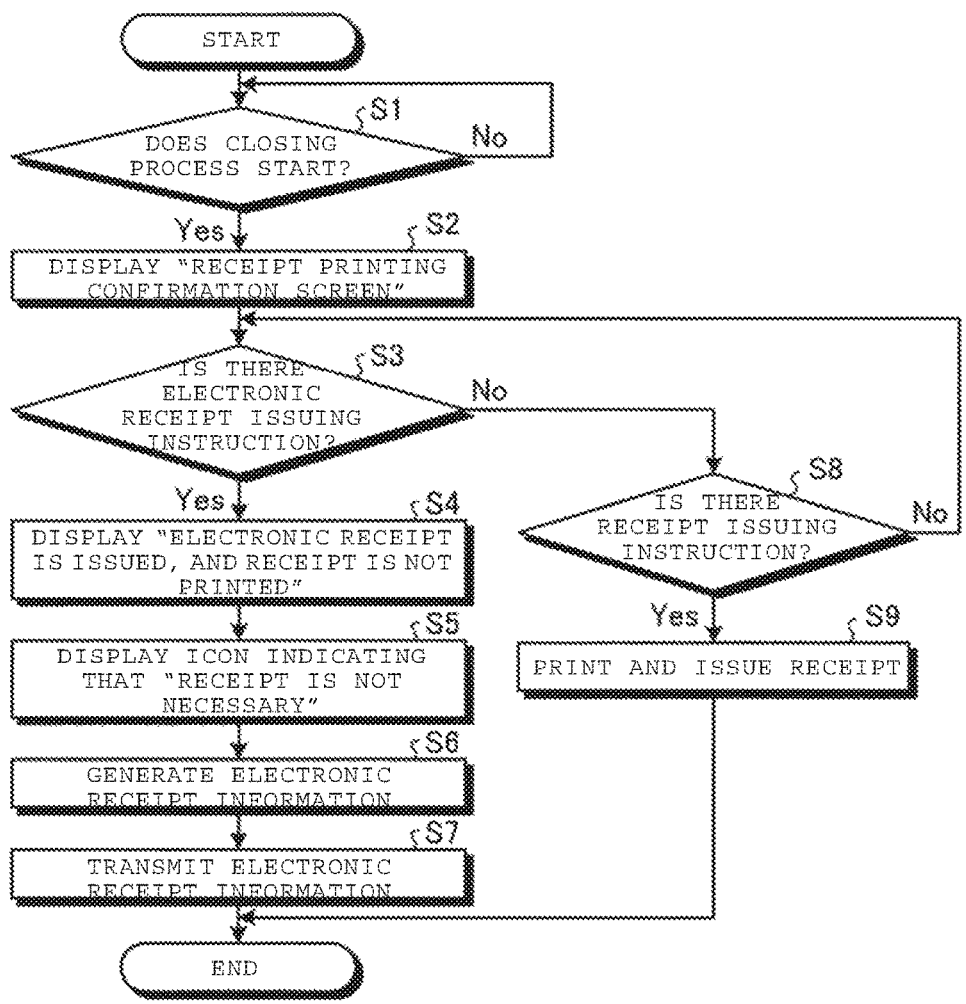
FIG. 7 is a flowchart illustrating a flow of the electronic receipt process.

In addition, when the "issue electronic receipt" button Q1 is operated by the operator via the input unit 31, the CPU 21 (the electronic receipt issuing instruction unit 61) of the POS terminal 2 displays an icon i indicating that "a receipt is not necessary" in a member information area which is displayed on the operator display unit 28, as illustrated in FIG. 10 (step S5 of FIG. 7). This prevents the operator from being perplexed due to a receipt not being output.

In addition, when it is determined that there is an electronic receipt issuing instruction (Yes in step S3), the CPU 21 (the electronic receipt generation unit 26) of the POS terminal 2 transmits merchandise transaction data to a headquarter server of the company. In addition, based on merchandise information and settlement information which are registered during settlement by a merchandise sales data process, separately from the merchandise transaction data, the CPU 21 extracts a company code (an identification code of a company operating stores), a business type and business category code, a store code, a consumer membership code, a POS number of the POS terminal 2, a receipt number, merchandise sales data, and the like from the identification code management region 23a provided in the storage unit 23, so as to convert the extracted information into a format of electronic receipt, thereby generating electronic receipt information (step S6). The electronic receipt information is generated in a data format such as text, XML, or JSON, of which a file capacity is relatively small.

Subsequently, the CPU 21 (the transmission unit 27) of the POS terminal 2, which is connected to the LAN 4 in the store and the network 5 via the network interface 24, transmits the generated electronic receipt information to the electronic receipt server 6 (step S7), and finishes the process. In addition, as further described below, when it is determined that there is no electronic receipt issuing instruction, a paper receipt is printed and issued, and merchandise transaction data is transmitted to the headquarter server, thereby finishing the process.

Further, the CPU 21 of the POS terminal 2 implements the following countermeasures so as to prevent disorder when an offline state occurs when merchandise transaction data is transmitted to the headquarter server.

1. Retry transmission is automatically performed.

2. When the retry transmission is not possible, the merchandise transaction data is stored until an online state is recovered, and is sent to the headquarter server after the online state is recovered. In this case, the CPU 21 of the POS terminal 2 displays a message such as "Merchandise transaction data will be transmitted later" on the operator display unit 28.

On the other hand, when the "issue receipt" button Q2 is operated by the operator via the input unit 31, the CPU 21 (the electronic receipt issuing instruction unit 61) of the POS terminal 2 determines that there is a receipt issuing instruction.

When it is determined that there is a receipt issuing instruction (No in step S3, and Yes in step S8), the CPU 21 (the receipt printing unit 62) of the POS terminal 2 prints and issues a receipt associated with the merchandise sales data from a printer (not illustrated) (step S9). In addition, when it is detected that an off line state occurs when the electronic receipt information is generated, the CPU 21 (the electronic receipt generation unit 26) of the POS terminal 2 prints and issues a paper receipt. In this case, the CPU 21 (the electronic receipt generation unit 26) of the POS terminal 2 displays a message, "An electronic receipt will be issued after a network failure is removed" on the operator display unit 28 and the customer display unit 30, and also prints the message, "An electronic receipt will be issued after a network failure is removed" on the paper receipt.

Figure 11:
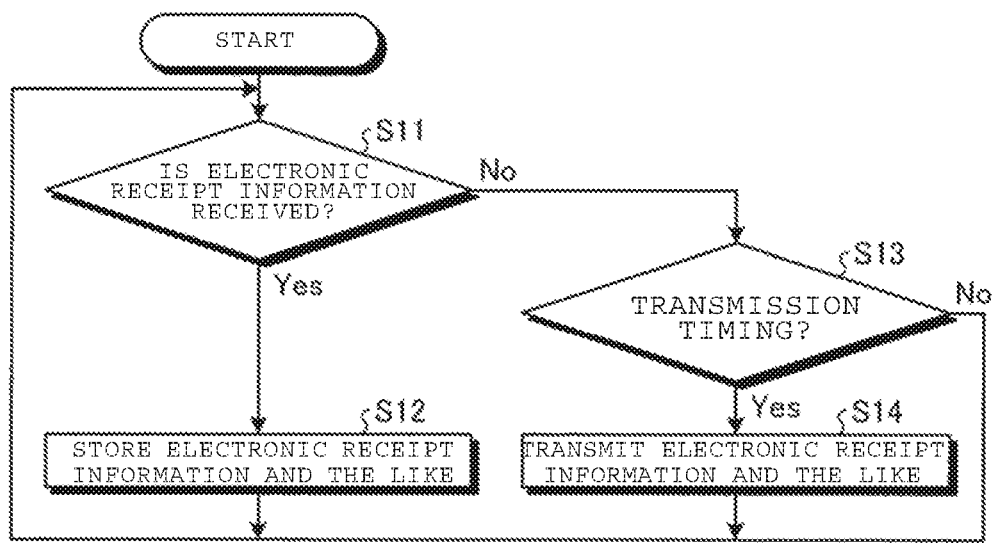
FIG. 11 is a flowchart illustrating a flow of an information transmission process performed in the electronic receipt server.

Next, with reference to a flowchart illustrated in FIG. 11, a description will be made of a flow of an electronic receipt management process executed when the CPU 41 of the electronic receipt server 6 is operated according to the electronic receipt management program P1 and an information transmission process executed when the CPU 41 is operated according to the information transmission program P2.

When the electronic receipt information transmitted from the POS terminal 2 is received via the network interface 44 (Yes in step S11), the CPU 41 of the electronic receipt server 6 stores the electronic receipt information in the electronic receipt management region 43a of the storage unit 43 as electronic receipt information of each company (step S12). In other words, the CPU 41 of the electronic receipt server 6 functions as electronic receipt management means for managing electronic receipt information in the storage unit 43 on a per company basis corresponding to a company code.

In addition, after storing the received electronic receipt information, the CPU 41 of the electronic receipt server 6 transmits the additional information managed in the information management region 43b and the electronic receipt information managed in the electronic receipt management region 43a to the electronic receipt management server 9 (step S14) at a preset transmission timing (No in step S11, and Yes in step S13), and then returns to step S11.

In addition, the CPU 21 (the electronic receipt generation unit 26) of the POS terminal 2 generates and transmits electronic receipt information to the electronic receipt server 6, but the present exemplary embodiment is not limited thereto. For example, the CPU 21 of the POS terminal 2 may transmit a store code, a consumer membership code, a POS number of the POS terminal 2, a receipt number, merchandise sales data, and the like to the electronic receipt server 6 based on merchandise information and settlement information which are registered during settlement by a merchandise sales data process, and the CPU 41 of the electronic receipt server 6 adds a company code and a business type and business category code thereto so as to generate electronic receipt information.

Next, with reference to a functional block diagram illustrated in FIG. 12 and a flowchart illustrated in FIG. 13, a description will be made of a flow of an electronic receipt management process executed when the CPU 51 of the electronic receipt management server 9 is operated according to the electronic receipt management program P3 and a merchandise information transmission process executed when the CPU 51 is operated according to the information transmission program P4.

Figure 12:
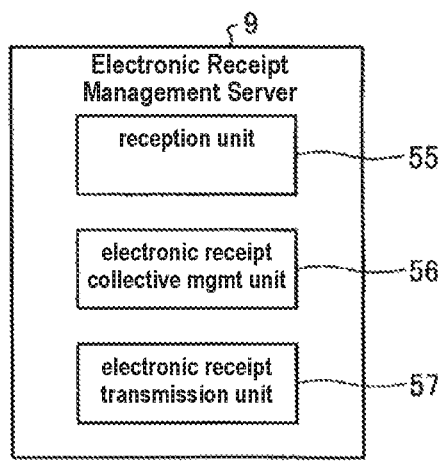
FIG. 12 is a functional block diagram of an electronic receipt management process and a merchandise information transmission process performed in the electronic receipt management server.

As illustrated in FIG. 12, the electronic receipt management program P3 and the information transmission program P4 executed by the electronic receipt management server 9 have a modular configuration which includes a reception unit 55 which functions as a reception means, an electronic receipt collective management unit 56 which functions as an electronic receipt collective management means, and an electronic receipt transmission unit 57 which functions as an electronic receipt transmission means. As for the underlying hardware, the CPU 51 reads and executes the electronic receipt management program P3 and the information transmission program P4 from the storage unit 53 so that the respective units are loaded into the memory 52. Therefore, the reception unit 55, the electronic receipt collective management unit 56, and the electronic receipt transmission unit 57 are embodied in the memory 52.

The reception unit 55 receives not only a company code indicating a company operating stores, but also electronic receipt information on a per company basis, which is electronically processed instead of a receipt which is printed and issued in a merchandise sales data process.

The electronic receipt collective management unit 56 stores the electronic receipt information on a per company basis received by the reception unit 55 in the electronic receipt management region 53*a* of the storage unit 53, for collective management.

The electronic receipt transmission unit 57 acquires electronic receipt information including one or more company codes correlated with a membership code from the electronic receipt management region 53*a*, to the portable terminal 8 correlated with the membership code of a predetermined consumer.

Figure 13:
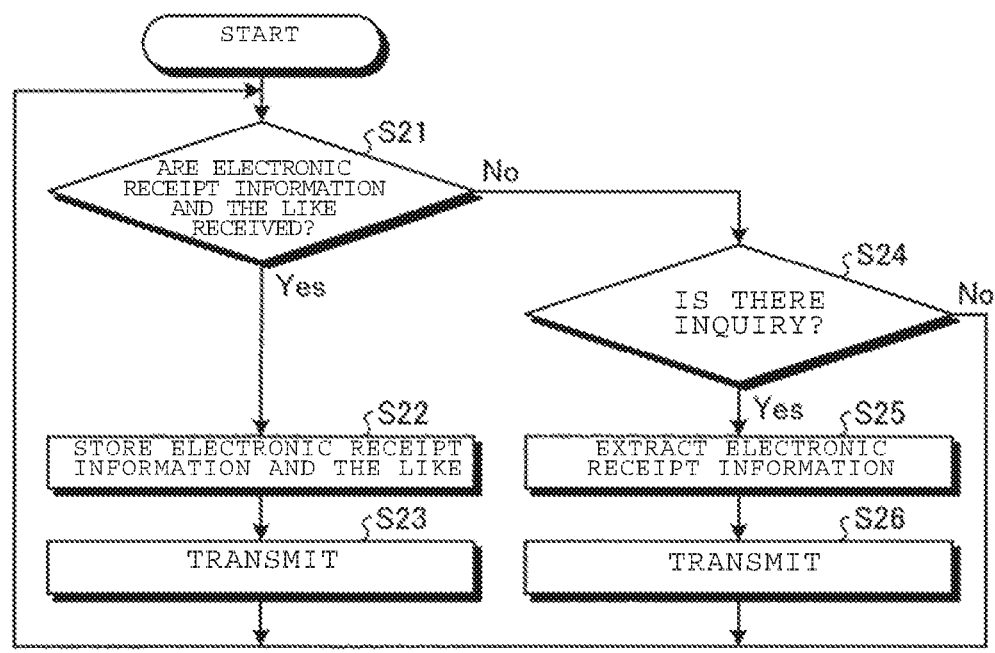
FIG. 13 is a flowchart illustrating a flow of the electronic receipt management process and the merchandise information transmission process.

As illustrated in FIG. 13, the CPU 51 (the reception unit 55) of the electronic receipt management server 9 determines whether or not electronic receipt information and additional information transmitted from the electronic receipt server 6 of each company are received via the network interface 54 (step S21).

When the electronic receipt information and the additional information are received (Yes in step S21), the CPU 51 (the electronic receipt collective management unit 56) of the electronic receipt management server 9 stores the electronic receipt information and additional information of various companies in the electronic receipt management region 53*a* of the storage unit 53 (step S22).

In addition, the CPU 51 (the electronic receipt transmission unit 57) of the electronic receipt management server 9 stores the electronic receipt information and the additional information in the electronic receipt management region 53*a* and then transmits the electronic receipt information and the additional information to the portable terminal 8 (step S23), and then returns to step S21. Further, when transmission of the electronic receipt information is completed, a flag indicating the completion of transmission is stored in relation to the electronic receipt information of the electronic receipt management region 53*a*, so that a transmission result of the electronic receipt information can be managed.

Furthermore, when there is an electronic receipt information inquiry from the portable terminal 8 (No in step S21, and Yes in step S24), the CPU 51 (the electronic receipt transmission unit 57) of the electronic receipt management server 9 extracts the additional information and the electronic receipt information managed in the electronic receipt management region 53*a* based on content of the electronic receipt information inquiry (step S25), so as to transmit the extracted information to the portable terminal 8 which is a source of the inquiry (step S26), and returns to step S21.

Next, with reference to a functional block diagram illustrated in FIG. 14 and a flowchart illustrated in FIG. 15, a description will be made of a flow of an electronic receipt reception process executed when the CPU 11 of the portable terminal 8 is operated according to the electronic receipt support program P11 and an electronic receipt viewing process executed when the CPU 11 is operated according to the electronic receipt viewing program P12.

Figure 14:
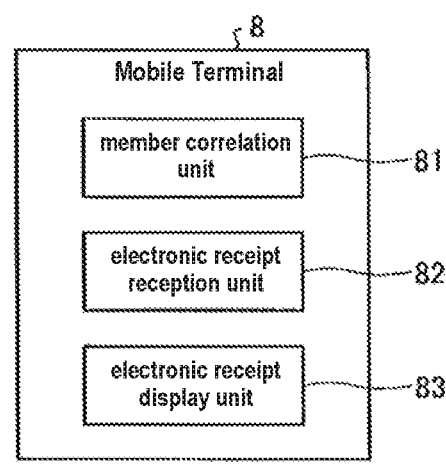
FIG. 14 is a functional block diagram of an electronic receipt reception process and an electronic receipt viewing process performed in the portable terminal.

As illustrated in FIG. 14, the electronic receipt support program P11 and the electronic receipt viewing program P12 executed by the portable terminal 8 have a modular configuration which includes a member correlation unit 81 which functions as member correlation means, an electronic receipt reception unit 82 which functions as electronic receipt reception means, and an electronic receipt display unit 83 which functions electronic receipt display means. As for the underlying hardware, the CPU 11 reads and executes the electronic receipt support program P11 and the electronic receipt viewing program P12 from the storage unit 13 so that the respective units are loaded into the memory 12. Therefore, the member correlation unit 81, the electronic receipt reception unit 82, and the electronic receipt display unit 83 are embodied in the memory 12.

The member correlation unit 81 correlates a membership code of a predetermined consumer with the portable terminal 8.

The electronic receipt reception unit 82 receives electronic receipt information including at least one or more company codes correlated with the membership code, from the electronic receipt management server 9 which collectively manages the electronic receipt information.

The electronic receipt display unit 83 arranges the electronic receipt information received by the electronic receipt reception unit 82 on a company code basis and displays the arranged electronic receipt information on the display unit 17.

Figure 15:
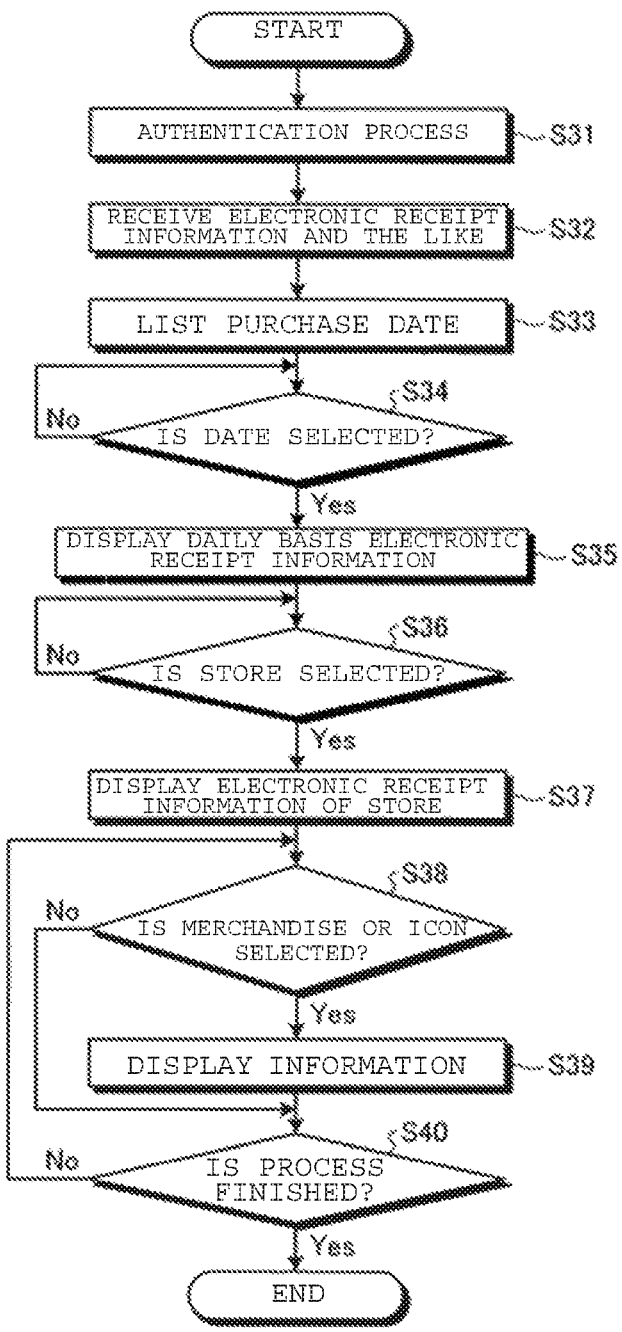
FIG. 15 is a flowchart illustrating a flow of the electronic receipt reception process and the electronic receipt viewing process.

As illustrated in FIG. 15, first, the CPU 11 (the member correlation unit 81) of the portable terminal 8 accesses the electronic receipt management server 9, and performs an authentication process by inputting a membership code and a password (step S31). Accordingly, the portable terminal 8 is correlated with the membership code of the predetermined consumer.

After the authentication, the CPU 11 (the electronic receipt reception unit 82) of the portable terminal 8 receives additional information and electronic receipt information which correspond to the input membership code and are managed in the electronic receipt management region 53*a* (step S32). In addition, the additional information and the electronic receipt information may be received using an email.

Next, the CPU 11 (the electronic receipt display unit 83) of the portable terminal 8 lists the purchase date included in the electronic receipt information in a list form on the display unit 17 (step S33). The purchase date is listed on the display unit 17, and thus the portable terminal 8 prompts the user who is a consumer to select information.

Figure 16:
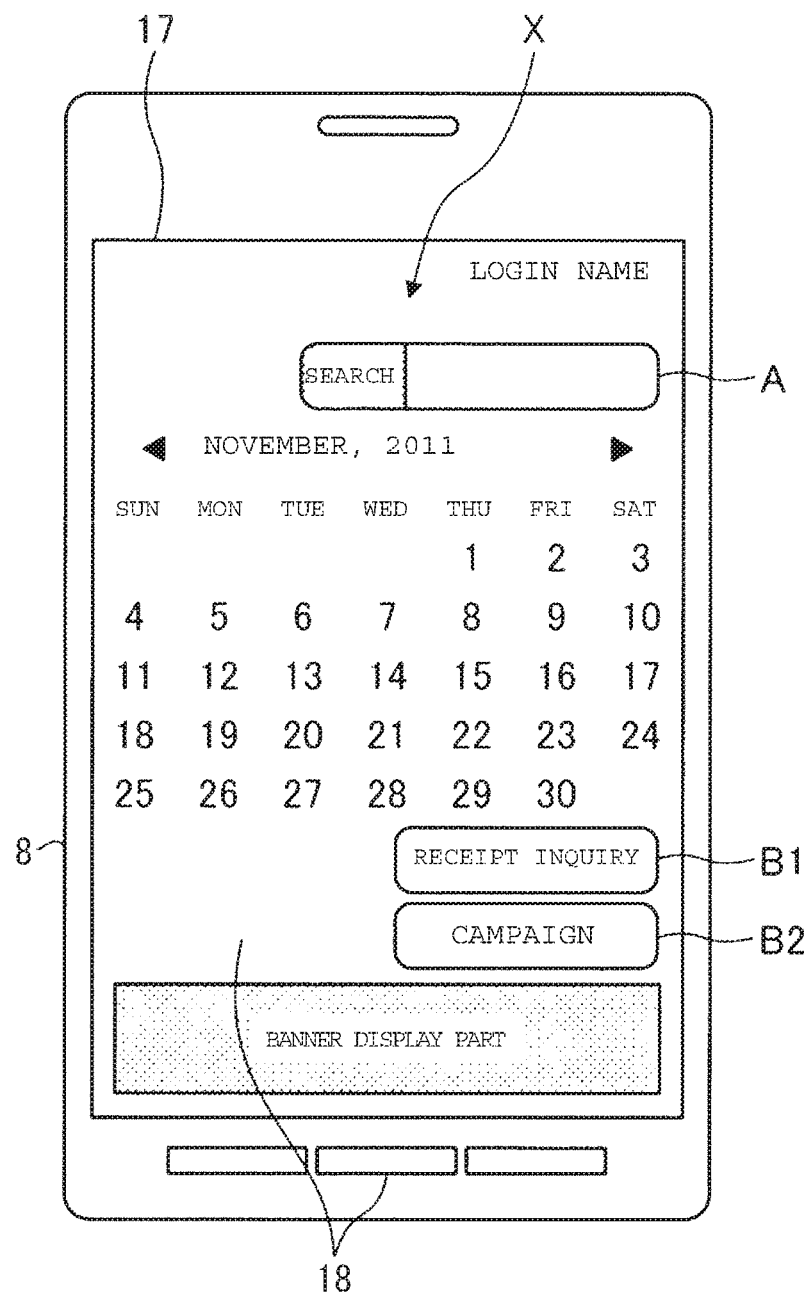
FIG. 16 is a front view illustrating a display example of the portable terminal.

FIG. 16 is a front view illustrating a display example X of the display unit 17 of the portable terminal 8. As illustrated in FIG. 16, in the display example X, the dates on which the user who owns the portable terminal 8 that accesses the electronic receipt management server 9, went shopping at stores of various companies are listed with changed colors in a calendar form. In addition, the CPU 11 (the electronic receipt display unit 83) of the portable terminal 8 performs the display of the dates so that a desired date is selected with a cursor which tracks an input of the input unit 18 among the dates listed with changed colors.

In addition, as illustrated in FIG. 16, in the display example X, a search window A for designating a character string serving as a search key or a keyword is provided. The CPU 11 of the portable terminal 8 may narrow electronic receipt information including a language or a keyword designated in the search window A.

Further, in the display example X, as illustrated in FIG. 16, a "receipt inquiry" button B1 for fixing a desired date selected with the cursor is provided. The CPU 11 of the portable terminal 8 may determine that a date is selected when the user just taps the desired date, and may determine that a data is selected when the user taps the desired date and then operates the "receipt inquiry" button B1.

When it is determined that the user selects a desired date by tapping the date (Yes in step S34), the CPU 11 (the electronic receipt display unit 83) of the portable terminal 8 displays electronic receipt information corresponding to the selected date on the display unit 17 (step S35).

Figure 17:
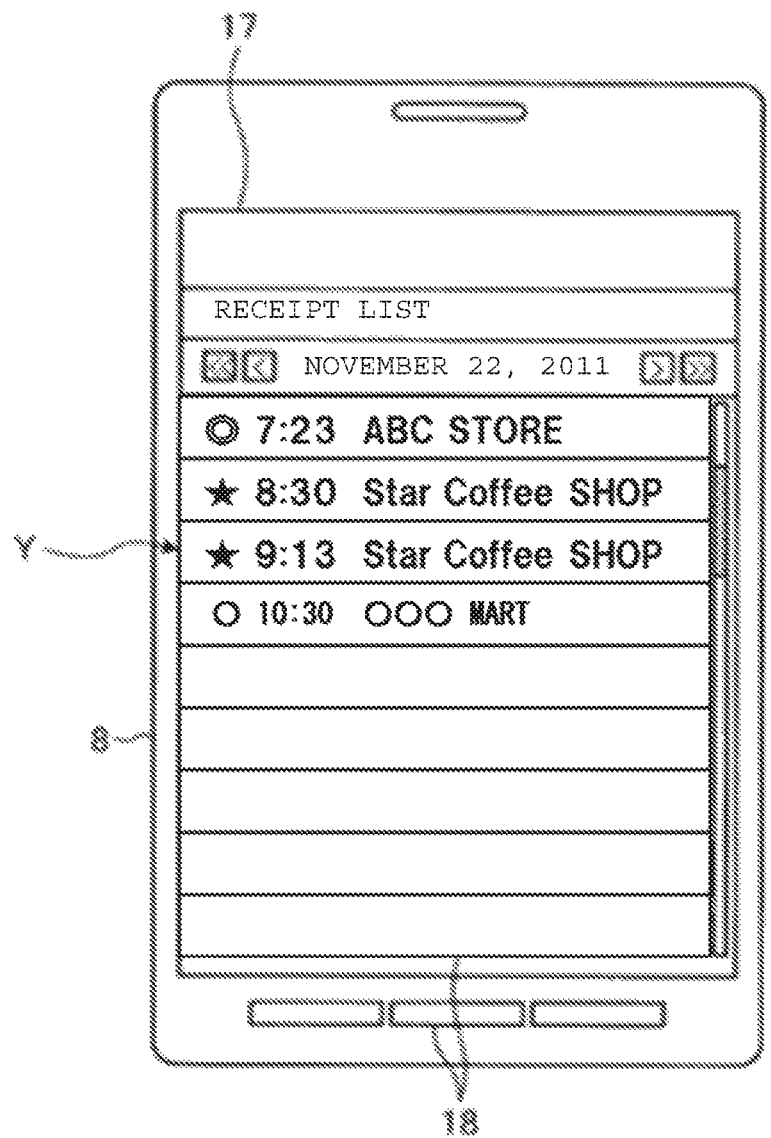
FIG. 17 is a front view illustrating a display example of the portable terminal.

FIG. 17 is a front view illustrating a display example Y in the portable terminal. As illustrated in FIG. 17, in the display example Y, stores of various companies at which the user who owns the portable terminal 8 that accesses the electronic receipt management server 9 did shopping are listed depending on dates. More specifically, in the display example Y, the electronic receipt information is displayed in a time series in order in which the electronic receipt information is received, and a company mark, a transaction time, a company name, and a store name are displayed. In addition, the CPU 11 (the electronic receipt display unit 83) of the portable terminal 8 performs the display so that a desired store may be selected with a cursor which tracks an input of the input unit 18 among the listed stores information.

When it is determined that the user selects a desired store (Yes in step S36), the CPU 11 (the electronic receipt display unit 83) of the portable terminal 8 displays electronic receipt information corresponding to the selected store on the display unit 17 (step S37).

Figure 18:
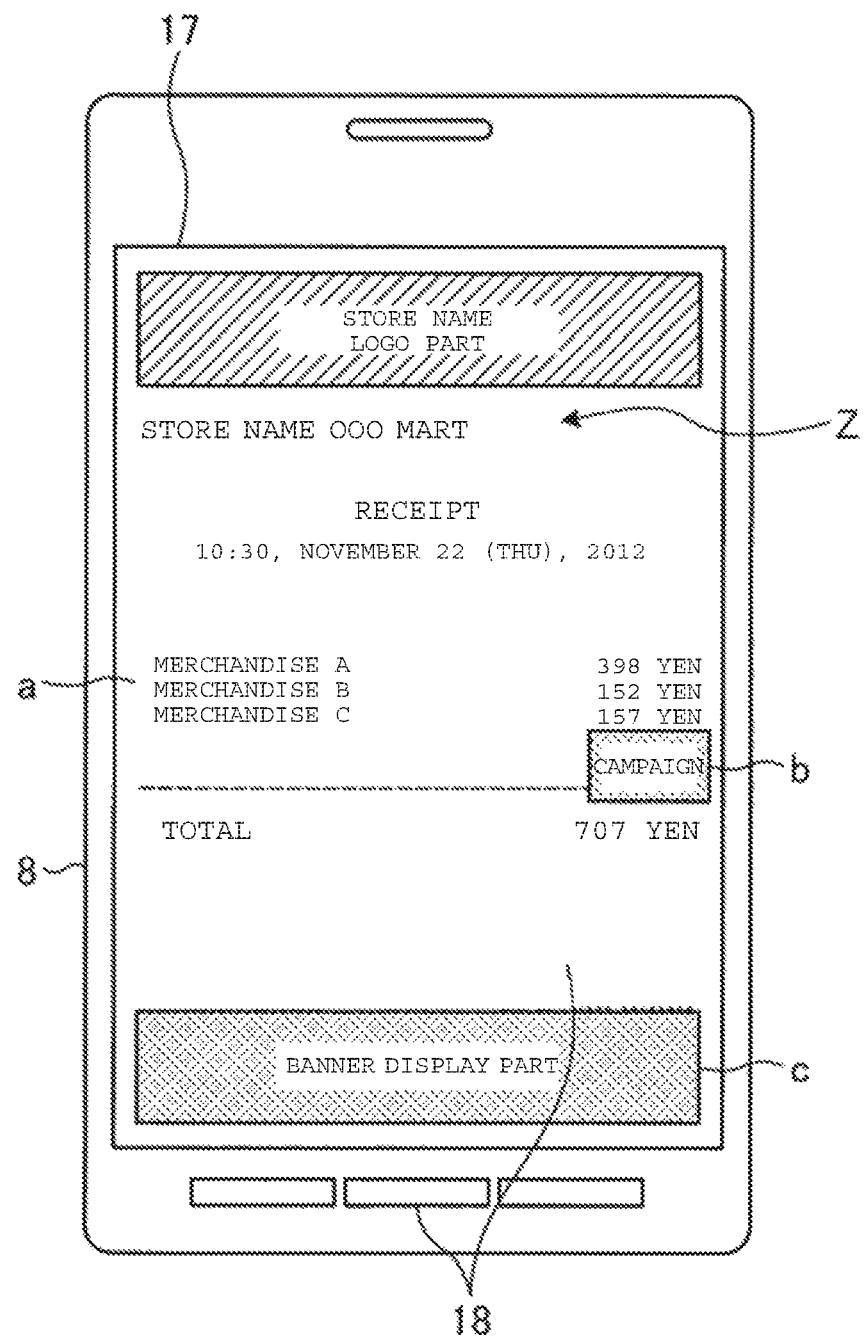
FIG. 18 is a front view illustrating a display example of the portable terminal.

FIG. 18 is a front view illustrating a display example Z on the display unit 17 of the portable terminal 8. As illustrated in FIG. 18, the display example Z displays electronic receipt information of a desired date on the desired date on which the user who owns the portable terminal 8 that accesses the electronic receipt management server 9 went shopping. In the display example Z, the same layout as that of a paper receipt is displayed by analyzing the electronic receipt information, and merchandise a or an icon b (a button-shaped icon indicating "campaign" in FIG. 18) indicating various additional information correlated with the merchandise can be focused among the information with a cursor which tracks an input of the input unit 18.

In addition, a screen display image is not necessarily required to be a receipt image. However, the electronic receipt information is used instead of paper receipt information, and is thus electronic merchandise purchase evidence information which verifies purchase of merchandise. In the display example Z, the following information is displayed in order to use the electronic receipt information as merchandise purchase evidence information when the merchandise is returned.

Store name
Purchase date and time
Details of purchased merchandise
Total sales amount
Deposit amount
Change amount
Register number
Transaction number Here, when the user selects proper merchandise or an icon correlated with merchandise (Yes in step S38), the CPU 11 (the electronic receipt display unit 83) of the portable terminal 8 accesses the network 5 via the network interface 14, and acquires various information from the network 5 based on access information which is associated with the selected merchandise or icon so as to display the acquired information on the display unit 17 (step S39).

For example, when a home page associated with merchandise as access information to the merchandise is set as a merchandise information link, when desired merchandise is selected, a home page associated with the merchandise is displayed on the display unit 17.

In addition, when a home page associated with CM is set in a banner c which is a kind of icon as access information, when the banner c is selected, the CM associated with the banner c is displayed on the display unit 17.

The CPU 11 of the portable terminal 8 finishes the process when finishing of the electronic receipt viewing process is declared from the input unit 18 (Yes in step S40).

When finishing of the electronic receipt viewing process is not declared from the input unit 18 (No in step S40), the CPU 11 of the portable terminal 8 returns to step S38 and waits for merchandise or an icon correlated with merchandise to be selected.

Figure 19:
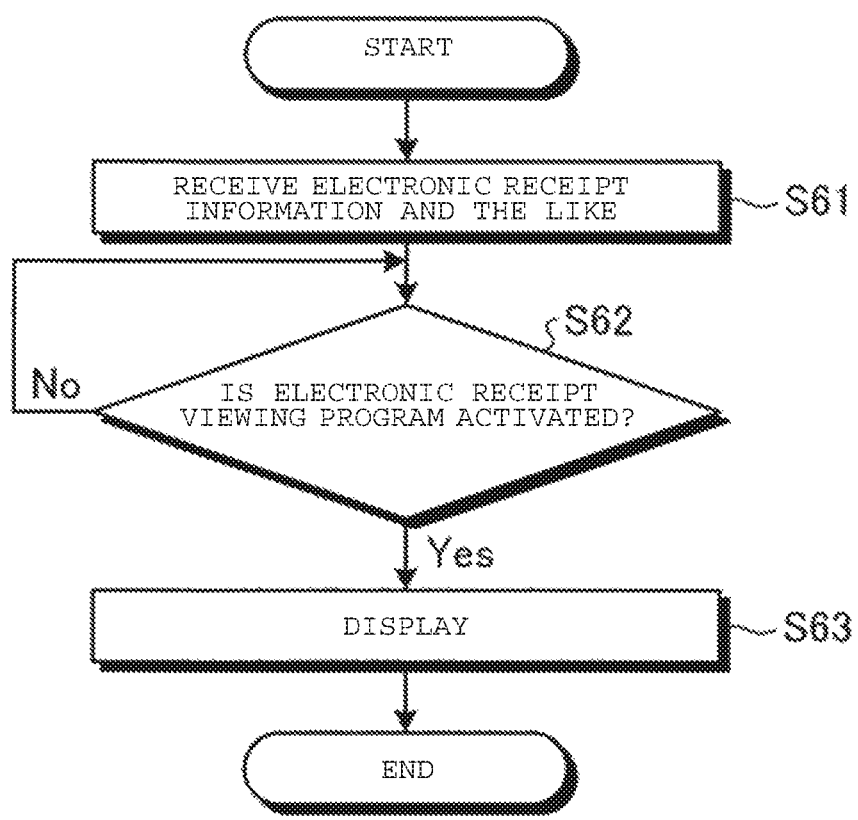
FIG. 19 is a flowchart illustrating a flow of the electronic receipt reception process and the electronic receipt viewing process.

In addition, with reference to a flowchart of FIG. 19, a description will also be made of a case where the portable terminal 8 does not access the electronic receipt management server 9 as described in step S23 of FIG. 13, but the portable terminal 8 receives electronic receipt information and additional information from the electronic receipt management server 9.

The CPU 11 (the electronic receipt reception unit 82) of the portable terminal 8 receives electronic receipt information and additional information from the electronic receipt management server 9 (step S61).

Next, when the electronic receipt viewing program P12 is activated (Yes in step S62), the CPU 11 (the electronic receipt display unit 83) of the portable terminal 8 displays the received electronic receipt information and additional information in associated with a company code (step S63).

As above, according to the electronic receipt system of the present exemplary embodiment, unlike in the structure of an electronic receipt on a per company basis of the related art, the structure of an electronic receipt can be introduced beyond the company scope, and thus it is possible to promote introduction of an electronic receipt.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data processing apparatus comprising:
a terminal having an identification code, the terminal including a code reader, a printer, an input/output device, a memory, a network interface, and a processor configured to
control the code reader to read a user code;
retrieve data from the memory and generate electronic information from the data in correlation with the user code;
control the network interface to transmit the electronic information; and
control the input/output device to receive input from a user and provide notifications;
a portable terminal;
one or more first servers corresponding to the identification code; and
a second server, wherein
the input from the user includes an instruction for issuing electronic information;
the processor generates the electronic information when the instruction for issuing the electronic information is received;
the notifications include a notification that the electronic information is to be issued;
the processor controls the network interface to transmit the identification code with the electronic information to one of the first servers that corresponds to the identification code;
the processor controls the printer to print paper information associated with the electronic information when the instruction for issuing the electronic information is not received;
the processor determines whether an offline state occurs with respect to communication with the one of the first servers that corresponds to the identification code; and
if the processor determines that the offline state occurs with respect to the communication with the one of the first servers, the processor controls the printer to print the paper information.

2. The apparatus according to claim 1, wherein
the input/output device includes an input interface having a first input element to instruct the electronic information to be issued, and a second input element to instruct the paper information to be printed.

3. The apparatus according to claim 2, wherein
the input/output device receives the instruction to issue the electronic information in response to an input operation on the first input element and the printer prints the paper information in response to an input operation on the second input element.

4. The apparatus according to claim 1, wherein
the input/output device includes a first display unit and a second display unit, and the processor controls the input/output device to issue a notification that the electronic information is to be issued, using the first display unit and the second display unit, when the instruction for issuing the electronic information is received.

5. The apparatus according to claim 1, wherein
the notifications include a notification that the paper information is not printed, and the processor controls the input/output device to issue the notification that the paper information is not printed using an operator display, when the instruction for issuing the electronic information is received.

6. The apparatus according to claim 1, wherein the code reader includes one of a scanner, a bar code reader, a two-dimensional code reader, and a Near Field Communication (NFC) receiver.

7. A data processing apparatus comprising:
a terminal including a code reader, which includes one of a scanner, a bar code reader, a two-dimensional code reader, and a Near Field Communication (NFC) receiver, the terminal also including a printer, an input/output device, a memory, a network interface, and a processor configured to
control the code reader to read a user code;
retrieve data from the memory and generate electronic information from the data in correlation with the user code;
control the network interface to transmit the electronic information;
control the input/output device to receive input from a user and provide notifications;
a portable terminal having an identification code;
a plurality of first servers, at least one of which corresponds to the identification code; and
a second server, wherein
the input from the user includes an instruction for issuing electronic information;
the processor generates the electronic information when the instruction for issuing the electronic information is received;
the notifications include a notification that the electronic information is to be issued;
the processor controls the network interface to transmit the identification code with the electronic information to one of the first servers that corresponds to the identification code;
the processor controls the printer to print paper information associated with the electronic information when the instruction for issuing the electronic information is not received;
the processor determines whether an offline state occurs with respect to communication with the one of the first servers that corresponds to the identification code; and
if the processor determines that the offline state occurs with respect to communication with the one of the first servers, the processor controls the printer to print the paper information.

8. The apparatus according to claim 7, wherein
the input/output device includes an input interface having a first input element to instruct the electronic information to be issued, and a second input element to instruct the paper information to be printed.

9. The apparatus according to claim 8, wherein
the input/output device receives the instruction to issue the electronic information in response to an input operation on the first input element and the printer prints the paper information in response to an input operation on the second input element.

10. The apparatus according to claim 7, wherein
the input/output device includes a first display unit and a second display unit, and the processor controls the input/output device to issue a notification that the electronic information is to be issued, using the first display unit and the second display unit, when the instruction for issuing the electronic information is received.

11. The apparatus according to claim 7, wherein
the notifications include a notification that the paper information is not printed, and the processor controls the input/output device to issue the notification that the paper information is not printed using an operator display, when the instruction for issuing the electronic information is received.

12. The apparatus according to claim 7, wherein at least one of the first servers does not correspond to the identification code.

13. A non-transitory computer readable medium comprising instructions for causing a terminal to carry out a data processing method, said method comprising:
controlling a code reader to read a user code;
controlling an input/output device to receive a first instruction for issuing electronic information;
controlling the input/output device to receive a second instruction for issuing paper information;
when the first instruction is received, generating the electronic information in correlation with the user code, issuing a notification on the input/output device that the electronic information is to be issued, and transmitting an identification code associated with the terminal with the electronic information to a server corresponding to the identification code;
when the second instruction is received, controlling a printer to print paper information associated with the electronic information; and
determining whether an offline state occurs with respect to communication with the one of the first servers that corresponds to the identification code, and, if it is determined that the offline state occurs with respect to communication with the one of the first servers, controlling the printer to print the paper information.

14. The non-transitory computer readable medium according to claim 13, wherein one of the first instruction and the second instruction is received through respective first and second input elements provided in an input interface of the input/output device.

15. The non-transitory computer readable medium according to claim 14, wherein said receiving the first instructions includes detecting an operation of the first input element and said receiving the second instructions includes detecting an operation of the second input element.

16. The non-transitory computer readable medium according to claim 13, wherein the notification is issued on a first display and a second display of the input/output device.

17. The non-transitory computer readable medium according to claim 13, wherein the method further comprises:
when the first instruction is received, issuing a notification on a display of the input/output device that the paper information is not printed.

* * * * *